Dec. 7, 1954  J. N. KIEP  2,696,081
HYDRAULIC COUPLING ARRANGEMENT
Filed June 28, 1952
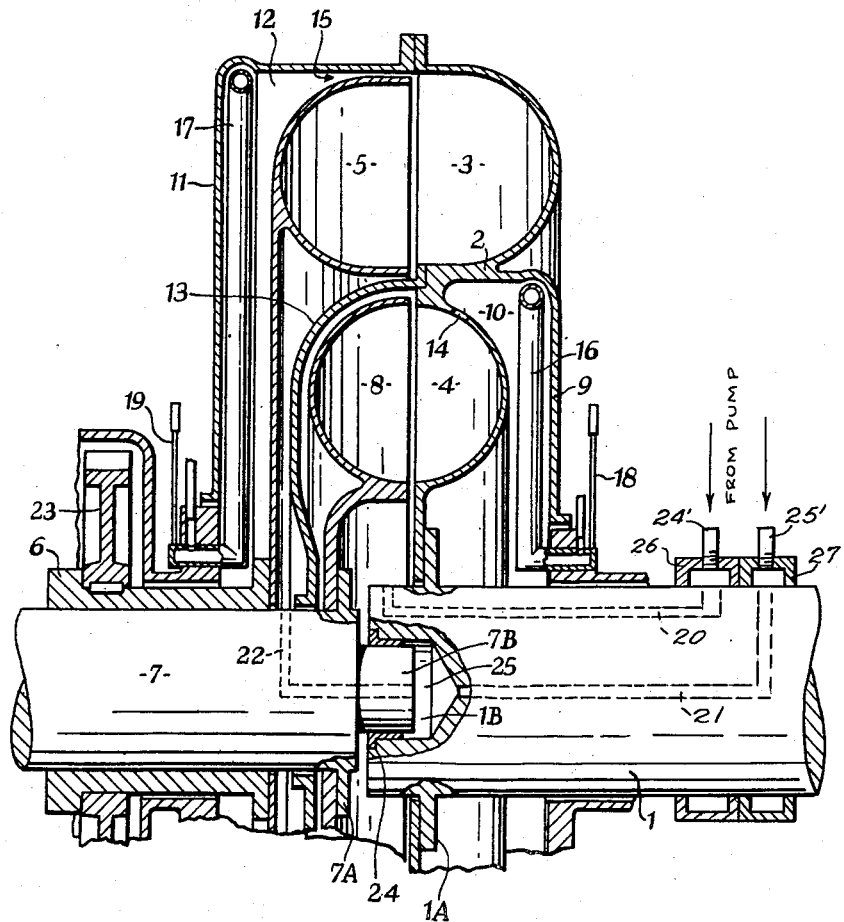
INVENTOR
Johann Nikolaus Kiep.
BY
ATTORNEYS United States Patent Office 2,696,081
Patented Dec. 7, 1954

2,696,081

HYDRAULIC COUPLING ARRANGEMENT

Johann Nikolaus Kiep, Hamburg-Hochkamp, Germany, assignor to Hydraulic Coupling Patents Limited, Isleworth, England, a British company Application June 28, 1952, Serial No. 296,127

Claims priority, application Germany July 5, 1951

2 Claims. (Cl. 60—54)

This invention relates to a hydraulic coupling arrangement of the type wherein two hydraulic couplings capable of being filled and emptied are provided, one between a first shaft and a second shaft and the other between said first shaft and a third shaft. An arrangement of this type may for example be incorporated in reversible power transmission mechanism, the second shaft being connected to a member to be driven for forward driving thereof, and the third shaft being connected to said member to be driven for reverse driving thereof, so that upon rotation of said first shaft by driving means and with one of said couplings filled and the other empty said member to be driven is rotated in forward or reverse according to which of said couplings is filled. Reversal of the direction of rotation of said member is effected by emptying the filled coupling and filling the empty coupling.

The object of the invention is to provide, in an arrangement of the type specified, an advantageous mutual disposition of the two hydraulic couplings.

According to the invention the working circuits of the two couplings are disposed concentrically.

In many applications of a reversible power transmission mechanism as above described the member to be driven is required to be driven predominantly in one direction only, for example the forward direction, and is driven in the other direction only occasionally or only for short periods. In such cases only the coupling which provides the predominant direction of rotation need be of high efficiency, a lower efficiency of the other coupling being acceptable if the resulting simplification of the coupling arrangement results in reduced cost of production.

In an arrangement according to the invention the working circuit of the coupling which provides the predominating rotation of the driven member is preferably disposed around the working circuit of the other coupling.

The inner profile diameter of the working chamber of a coupling may be considerably increased with respect to its outer profile diameter without impairing the transmission efficiency when the slip is small, if the outer profile diameter is increased only by a substantially smaller percentage, and in an arrangement according to the invention the working chamber of the outer coupling may have a larger ratio, as between the inner profile diameter $Di$ and the outer profile diameter $Da$, than in normal couplings of the Föttinger or Vulcan type, the ratio $Di/Da$ being greater than 0.5 and preferably being about 0.7. The working chamber of the inner coupling may have an outer profile diameter which is nearly as large as the inner profile diameter of the outer coupling.

Filling and emptying of the couplings may be effected in any suitable manner; for example the couplings may be filled by means of a filling pump and emptied by means of scoop tubes or controlled valves.

In order that the invention may be clearly understood and readily carried into effect it will now be described in more detail with reference to the accompanying drawing, which is a diagrammatic sectional view of a coupling arrangement, according to the invention, suitable for incorporation in reversible power transmission mechanism.

Referring to the drawing, the driving shaft 1, to which may be coupled a motor (not shown) is provided with a flange 1A to which is secured a shell 2 which is formed so as to provide radially spaced inner and outer impeller shells, and which is provided with an outer set of impeller blades 3 and an inner set 4. The impeller blades 3 cooperate with a runner 5 which is fixed on a hollow shaft 6 which is rotatable around a shaft 7, and the impeller blades 4 co-operate with a runner 8 secured to a flange 7A on the shaft 7, which is formed with a reduced end 7B which projects into a socket 1B in the end of shaft 1, a liquid seal 24 being provided as shown between the reduced end and the side wall of the socket, said seal permitting relative rotation of shafts 1 and 7 and preventing the escape of liquid from space 25 between the ends of the shafts. The shell 2 is connected to a shell 9 which encloses a scoop chamber 10, a shell 11 which encloses a scoop chamber 12, and a shell 13 which projects between the runners 5 and 8 and encloses the runner 8. The scoop chamber 10 communicates via openings 14 with the working chamber of the inner coupling comprising the impeller 4 and runner 8, and the scoop chamber 12 communicates, via the gap 15 between the back of the runner 5 and the outer part of the shell 11, with the working chamber of the outer coupling comprising impeller 3 and runner 5. Scoop tubes 16 and 17 provided in the respective scoop chambers 10 and 12 and mounted in a stationary or, as shown, angularly movable manner in fixed parts of the housing, serve for emptying the respective working chambers. Control levers 18 and 19 are provided for angularly moving the scoop tubes 16 and 17, respectively. Filling of the chambers is effected by means of a suitable pump (not shown) via pipes 24' and 25' which communicate, via annular spaces in stationary collars 26 and 27, with ducts 20 and 21 in shaft 1, duct 20 communicating with the working chamber of coupling 4, 8 and duct 21 communicating with a duct 22, in shaft 7, which communicates with the working chamber of coupling 3, 5.

In order to provide a reversible power transmission mechanism, the hollow shaft 6 may be connected, for example via a gear wheel 23, to a driven member (not shown) so as to provide rotation of said member in one direction, and the shaft 7 may be connected to said member in such manner as to provide rotation thereof in the other direction. For example shaft 6 may be connected to said member via gearing providing direct drive and the shaft 7 may be connected to it through the intermediary of reverse gearing. Thus forward or reverse drive of said member is obtained according to which of the couplings is filled, the outer coupling 3, 5 being employed for driving said member in the direction which is predominantly required, for example forward direction, and the inner coupling 4, 8 being employed for driving in the direction which is required only occasionally or for short periods. Preferably the ratio $Di/Da$ for the outer coupling 3, 5 is greater than 0.5, being for example about 0.7.

I claim:

1. A hydraulic coupling arrangement comprising a first shaft, a shell carried by said first shaft, and formed to provide an inner impeller shell provided with at least one aperture and an outer impeller shell, a first set of impeller blades on said inner shell, a second set of impeller blades on said outer shell, said inner and outer shells being concentrically arranged with respect to the axis of said first shaft, a second shaft coaxial with said first shaft, a first runner shell carried by said second shaft and provided with blading, said first runner shell and said inner impeller shell being mutually disposed to provide the working chamber of a first hydraulic coupling, a scoop tube chamber at the back of said inner impeller shell and communicating with the interior of said working chamber via said aperture, an adjustable scoop tube in said scoop tube chamber, a hollow third shaft on said second shaft and rotatable with respect thereto, a second runner shell carried by said third shaft and provided with blading, said second runner shell and said outer impeller shell being mutually disposed to provide the working chamber of a second hydraulic coupling, a second scoop tube chamber at the back of said second runner shell and communicating with the interior of the working space of said second coupling, and an adjustable second scoop tube in said second scoop tube chamber, said first shaft having therein ducts leading respectively to said working chambers.

2. A power transmitter for separately driving two concentric independently rotatable power output shafts from a coaxial power input shaft, said power transmitter including two radially spaced turbo couplings each having a vaned liquid impeller and a vaned liquid driven member; means for connecting both of said impellers to said driving shaft, separate means for connecting each of said driven members to a separate one of said driven shafts, one of said shafts having separate longitudinal passages for the separate filling of said turbo couplings; said casing having separate liquid discharge chambers each communicating with one of turbo couplings at the periphery of the latter, and non-rotatable liquid discharge pipes, one in each chamber, and each having its inlet adjacent to the periphery of a separate one of said chambers and its outlet adjacent to one of said shafts.

References Cited in the file of this patent

UNITED STATES PATENTS

| Number | Name | Date |
|---|---|---|
| 838,765 | Bissell | Dec. 18, 1906 |
| 2,226,802 | Black | Dec. 31, 1940 |
| 2,350,416 | Perry | June 6, 1944 |
| 2,360,259 | Murray | Oct. 10, 1944 |
| 2,400,307 | Hobbs et al. | May 14, 1946 |
| 2,421,501 | Hasbrouck | June 3, 1947 |
| 2,488,478 | Roberts | Nov. 15, 1949 |

FOREIGN PATENTS

| Number | Country | Date |
|---|---|---|
| 684,357 | France | Mar. 17, 1930 |